May 2, 1961     W. J. O'CONNOR ET AL     2,982,561
BOAT TRAILER SKID

Filed Jan. 28, 1959

INVENTORS
WALTER J. O'CONNOR
GEORGE R. ROBINSON
BY John E. Flanagan
THEIR ATTORNEYS

United States Patent Office 2,982,561
Patented May 2, 1961

2,982,561

BOAT TRAILER SKID

Walter J. O'Connor, 21 Warren St., and George R. Robinson, 50 Main St., both of Agawam, Mass.

Filed Jan. 28, 1959, Ser. No. 789,542

4 Claims. (Cl. 280—24)

This invention relates to devices used with automobile trailers and more particularly to an adapter skid which will allow a motor vehicle with a trailer clamp to pull a boat from a "waterbound" location while remaining a sizeable distance from the shore line of the body of water.

An object of the present invention is to provide a device which will enable a boater whose boat trailer with boat placed thereon, is located in the water, to pull the trailer out of the water without backing his motor vehicle to the usual soft sand shore area of a body of water.

Another object of the present invention is to provide a device as described above which will keep the trailer boom from dropping onto and digging into the ground.

Another object of the present invention is to provide a device as described above which will work in a complementary manner with a conventional automobile trailer clamp.

Another object of the present invention is to provide a device as described above which will be "self-directing," so called.

Other objects and advantages reside in the details of construction and operation as more fully hereinafter described and claimed, reference being had to the accompanying drawings forming part hereof, wherein like reference characters refer to like parts throughout, and in which:

Figure 1:
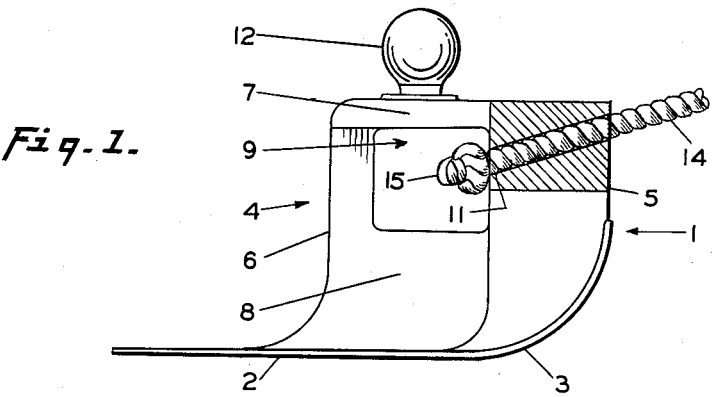
Figure 1 is a side elevational view of the boat trailer skid with a portion of the leading end of a side shown in section.
Figure 2:
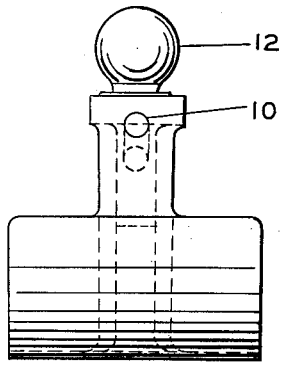
Figure 2 is a front elevational view of the novel boat trailer skid.
Figure 3:
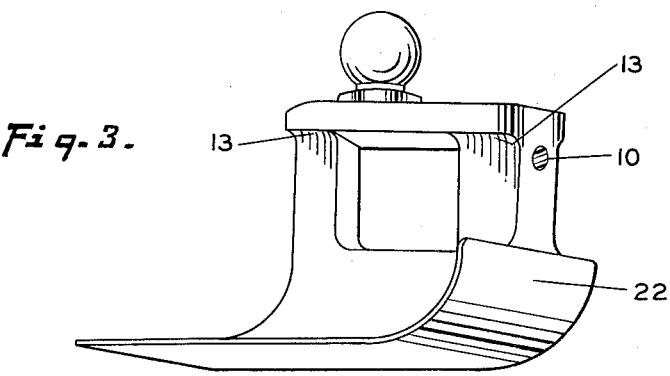
Figure 3 is a perspective view of the novel boat trailer skid.

Referring now specifically to Figures 1-3, it will be seen that an embodiment of the present invention is generally designated 1. It is a unitary structure having a toboggan shaped base 2 formed on a lower side, said base having an upwardly directed leading end 3.

Formed centrally on the upper side of base 2 is a support member generally designated 4, having leading side 5 and trailing side 6, each substantially perpendicular to the base 2 and upper side 7 and lower side 8, each substantially parallel to the base 2. An opening generally designated 9 is formed by the inner faces of sides 5, 6, 7 and 8 as shown in Figure 1. An inwardly directed and declining bore generally designated 10 which is in central longitudinal alignment with the base 2 is formed through side 5 of the support member 4, the inner end 11 of said bore being in communication with opening 9. A ball 12 is formed on the upper face of side 7, inwardly of side 5 as shown in Figure 1.

For reasons of economy and strength, ribs 13 are formed between side 7 and the sides 5 and 6.

A rope or line 14 is threaded through bore 10 and a fast knot 15 having a diameter greater than bore 10 is formed on the inner end of line 14 so that it cannot be pulled through bore 10, but rather when the line 14 is pulled, the boat skid and of course the boat trailer will be pulled.

Figure 4:
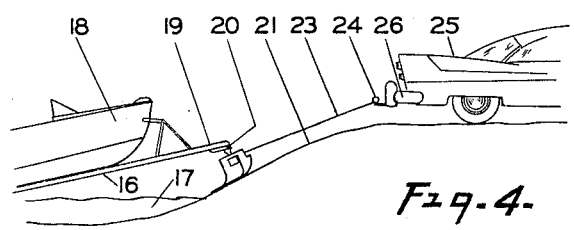
Figure 4 depicts the present invention in use.

In use, the boat trailer 16 (Figure 4), is backed in the water 17 and the boat 18 is properly secured thereto. Thereupon the boom 19 of the trailer which has a conventional ball socket 20 on its underside is secured to the novel boat skid by catching the ball 12 in the ball socket 20 and making them secured to one another, the means for doing so being conventional and unnecessary to show. The skid 1 will set on the ground 21 and at this time the prow 22 of the base 2 will not necessarily be facing or in alignment with the motor vehicle 25. Now the line 14 is threaded through bore 10 and the knot 15 is formed at its inner end and made fast. The free end 23 of the rope or line 14 is now made fast or secured to a conventional ball 24 mounted on the rear of motor vehicle 25. Of course, the free end 23 of the line 14 may be secured to the rear bumper 26 of the motor vehicle 25.

Now as the motor vehicle 25 begins to move away from the body of water, the rope or line 14 will straighten out so that the entire line 14, from knot 15 to ball 24 will be in a straight line. If the bore 10 is not directed towards the ball 24 when the motor vehicle moves, as the rope or line 14 becomes taut, the bore 10 will automatically swing around so that it is directed towards the ball 24. Likewise, in operation, if the skid encounters a rock or another object which kicks the skid 1 off course, the base will automatically become aligned with the ball because the rope or line 14, as explained will become taut and straight, causing the base to turn towards the ball 24. It is to be understood that the bore 10 is formed in alignment with the longitudinal center of the base 2, so that when the bore 10 is directed towards ball 24, the skid itself will be directed towards ball 24.

The location of bore 10 and the nonrigid attachment of line 14 to the support member 4, by means of knot 15 has been found by experiment to be of great value in making the skid self-aligning or directing to the ball 24 at the rear of the motor vehicle.

Of course, an adapter such as this should be of such construction that neither water, rust, sand, weeds or other foreign elements can foul it up. The simplicity of this unitary boat skid, which is manufactured by moulding, makes it foul-proof and the line or rope used with it can be easily replaced when worn.

In view of the foregoing description taken in conjunction with the accompanying drawings, it is believed that a clear understanding of the construction, operation and advantages of the device will be quite apparent to those skilled in this art. A more detailed description is accordingly deemed unnecessary.

What is claimed is:

1. A boat trailer skid comprising a toboggan shaped base, a support member formed on the upper side of the base, a lateral opening in said support member, a longitudinal bore extending from said lateral opening to the leading face of said support member, a rope or line, said rope or line extending from said lateral opening through said bore, means for preventing the lateral opening end of said line from passing through said bore, means for receiving a conventional trailer clamp ball socket, said last mentioned means being attached on the upper side of said support member, above said lateral opening.

2. A unitary boat trailer skid comprising a toboggan shaped base, said base having an upwardly directed leading end, a support member formed on the upper side of the said base, said support member having a lateral passage therein, a longitudinal passage in communication with the first named passage and extending to the leading face of said support member, a rope or line, said rope or line extending from said lateral opening through said longitudinal passage, means for preventing the lateral passage end of said line from passing through said longitudinal passage, means for receiving a conventional trailer clamp ball socket, said last mentioned means being attached on the upper side of said support member, above said lateral opening.

3. A boat trailer skid as claimed in claim 2; said support member formed centrally on said base and said longitudinal passage formed centrally in said support member.

4. A unitary boat trailer skid comprising a toboggan shaped base, said base having an upwardly directed leading end, a longitudinal support member formed centrally on the upper side of said base, said support member having a leading side, a trailing side, a lower side and an upper side, the inner faces of said support member sides forming an axial opening, a declining bore extending centrally form the outer face of the leading side of said support member to the inner face of said leading side, said bore being in communication with the said axial opening, a rope or line, said rope or line extending from said axial opening through said bore and outwardly beyond said outer face of the leading side of said support member, the axial end of said rope or line being of greater diameter than said bore, a ball formed on the upper face of the said upper side, inwardly of said leading side and in vertical alignment with said axial opening adapted to receive a ball socket of a conventional automobile trailer clamp.

References Cited in the file of this patent

UNITED STATES PATENTS

| | | |
|---|---|---|
| 1,210,694 | Ritchie | Jan. 2, 1917 |
| 2,132,744 | McCraw | Oct. 11, 1938 |
| 2,509,067 | Leach | May 23, 1950 |
| 2,528,890 | Lawrence | Nov. 7, 1950 |
| 2,723,130 | Andrews | Nov. 8, 1955 |
| 2,844,389 | Burnett | July 22, 1958 |